April 15, 1958 W. G. DUMKE ET AL 2,831,075
PUSH BUTTON SWITCHES
Filed Feb. 13, 1956 6 Sheets-Sheet 4

LATCH BAR URGED IN THIS DIRECTION
MOVEMENT TO LOCKED INTERLOCK

Fig.19A

MOVEMENT TO RELEASE INTERLOCK

INVENTORS
WILLY G. DUMKE by FRED O. DUMKE
Executor of the estate of
BY WILLY G. DUMKE, deceased
WILLIAM E. DUMKE
Foley & Lindberg
ATTORNEYS

United States Patent Office 2,831,075
Patented Apr. 15, 1958

2,831,075

PUSH BUTTON SWITCHES

Willy G. Dumke, deceased, late of Chicago, Ill., by Fred O. Dumke, executor, and William E. Dumke, Chicago, Ill., assignors to Switchcraft, Inc., a corporation of Illinois Application February 13, 1956, Serial No. 564,965

24 Claims. (Cl. 200—18)

This invention relates generally to push button switches, and more particularly to an improved switch employing a basic construction capable of being readily modified to perform a number of different functions.

The invention comprehends a push button switch assembly having a plurality of switching stations which assembly may easily be modified so that it will function with an interlocking action, or with an all-lock action, or with a non-locking action as desired. The interlocking or all-lock functions may be combined with the non-locking action at one or more stations as desired.

The invention also comprehends a positive lock-out when the switch is assembled for the interlocking function, insuring that only one push button may be actuated at a time, so that there is no possibility of simultaneously actuating two or more push button stations.

Another feature resides in the provision of a construction which enables a number of push button stations to be actuated selectively, the assembly under such condition being modified for an all-lock function, such stations being enabled to be held in the selected position by a positive lock-in lock-out mechanism. The lock-in lock-out mechanism prevents the selection of additional stations, or the release of a previously selected station, until the lock-in lock-out mechanism is released.

The same lock-in lock-out action can be had for a switch having the interlock function, so that once a station is selected or actuated, such station may be locked in to the exclusion of another station until the lock-in lock-out mechanism is released.

A feature of the invention resides in the provision of a latch bar which cooperates with the push button plunger at each switching station, such latch bar being common to the switch assembly for any of the functions recited. In any of the functions related, whether they be all-lock, interlock, or a combination of same with the non-locking function, the latch bar is suitably indexed for cooperation with the plunger at each switching station for the desired function, the latch bar cooperating with a push button plunger at a release station which restores the entire switching assembly for subsequent switching operations.

The same latch bar can be so configured as to cause positive locking in of one or more plungers of selected switching stations to the exclusion of other stations once the selected stations are locked in by means of a lock-in lock-out station, until the stations are released at the lock-in lock-out station.

A feature of the invention contemplates a latch bar for the push button plungers, which latch bar can be readily indexed to a desired position for interlock, all-lock or the non-lock functions.

With the foregoing considerations in mind it is a principal object of the invention to provide a push button actuated switch which can be operated as an interlock, all-lock, or non-lock device, or as a combination of either of the first two with the third function, which functions can readily be obtained by slight adjustments to the assembly.

Another object is to provide a latch bar for such a push button switch, which latch bar can readily be indexed to proper position according to the desired functions of the switch.

Another object is to provide a positively interlocked push button actuated switch.

Still another object is to provide a push button switch having a lighted indicator at each switching station, such indicator cooperating with a push button plunger so as to be lighted or extinguished as desired upon actuation of the push button plunger.

Other objects and important features of the invention will be apparent from a study of the specification following taken with the drawings which together show some preferred embodiments of the invention and what are now considered to be the best modes of practicing the principles thereof. Other embodiments of the invention may be suggested to those having the benefit of the teachings herein, and such other embodiments are intended to be reserved especially as they fall within the scope and spirit of the subjoined claims.

Referring now particularly to Figs. 1 to 4 of the drawings, the improved switch according to the present invention is referred to generally by the reference numeral 30. The switch 30 has a frame which consists of a channel shaped front frame member 31 and a similar channel shaped rear frame member 32 spaced therefrom. Each end of the frame members 31 and 32 is provided with an aperture 33, and an ear 34 of a spacer 36 extends through the apertures 33, each spacer 36 having a shoulder bearing against the inner face of the frame members 31 and 32 so as to maintain them a fixed distance apart. Each of the cross frame members 37 has a slot 38 near each end thereof, and an ear 39 extending from the web 40 of each member 31 and 32 extends through its corresponding slot 38.

Each cross member 37 is secured to the spacer 36 by means of screws 41 which are threaded into the spacer 36, there being washers 42 maintaining the spacer 36 and the member 37 in properly spaced relationship. Each cross member 37 has mounting lugs 43 at each end thereof so that the frame assembly thus far described can be bolted or otherwise secured to a piece of apparatus as desired.

Figure 12:
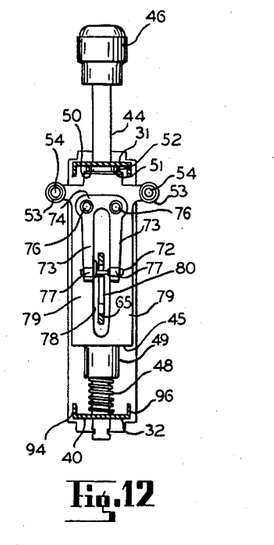
Fig. 12 is an end elevation view of one of the push button plunger assemblies at each push button station.

The two frame members 31 and 32 afford a support for a plunger 44 having a push button or knob 46 at the end thereof. Plungers 44 are guided in slots 47 formed in the webs 40 of the frame members 31 and 32, and are normally biased to a release position by means of a spring 48, one end of which bears against the web 40, and the other end of which bears against a cup shaped retainer 49 supported upon the plunger 44. As seen in Fig. 12 the cup shaped retainer 49 bears against a shoulder 45 on the plunger 44 and a rubber bumper 52 is supported on the plunger 44, so that when the switch is in the released position bumper 52 bears against the web 40 of frame member 31.

Figure 1:
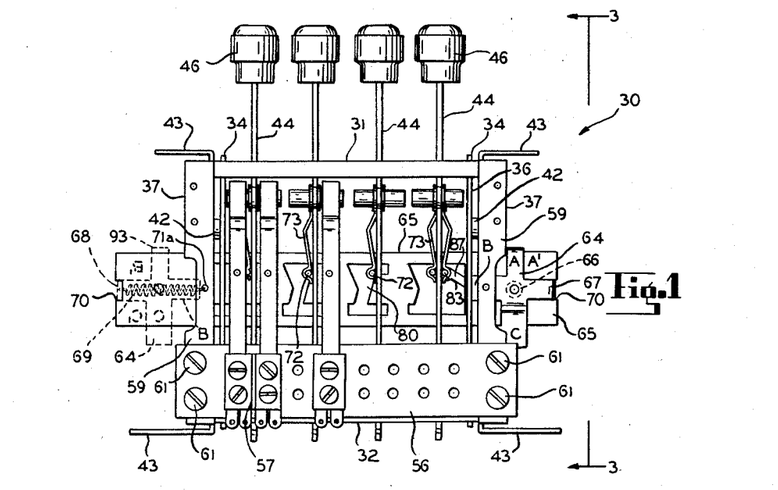
Fig. 1 is a top plan view of a typical push button actuated switch having the improvements according to the present invention embodied therein.
Figure 2:
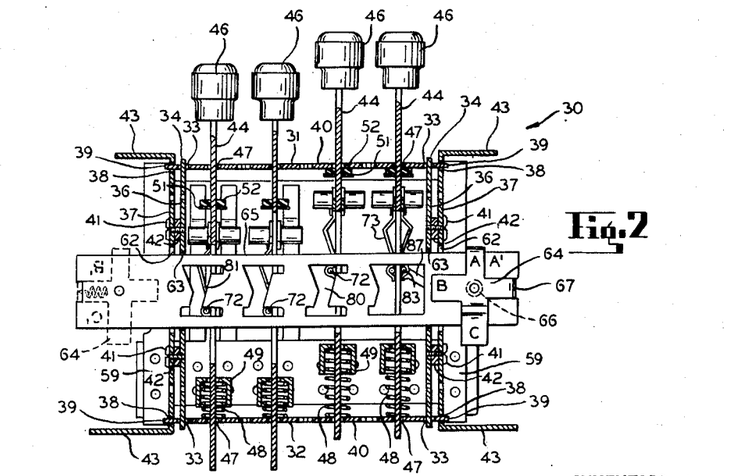
Fig. 2 is a view similar to Fig. 1, but showing a pair of switching stations in the actuated position, the switch in Figs. 1 and 2 being adjusted for the all-lock function.
Figures 3, 4, 5, 6, 7, 8, 9, 10:
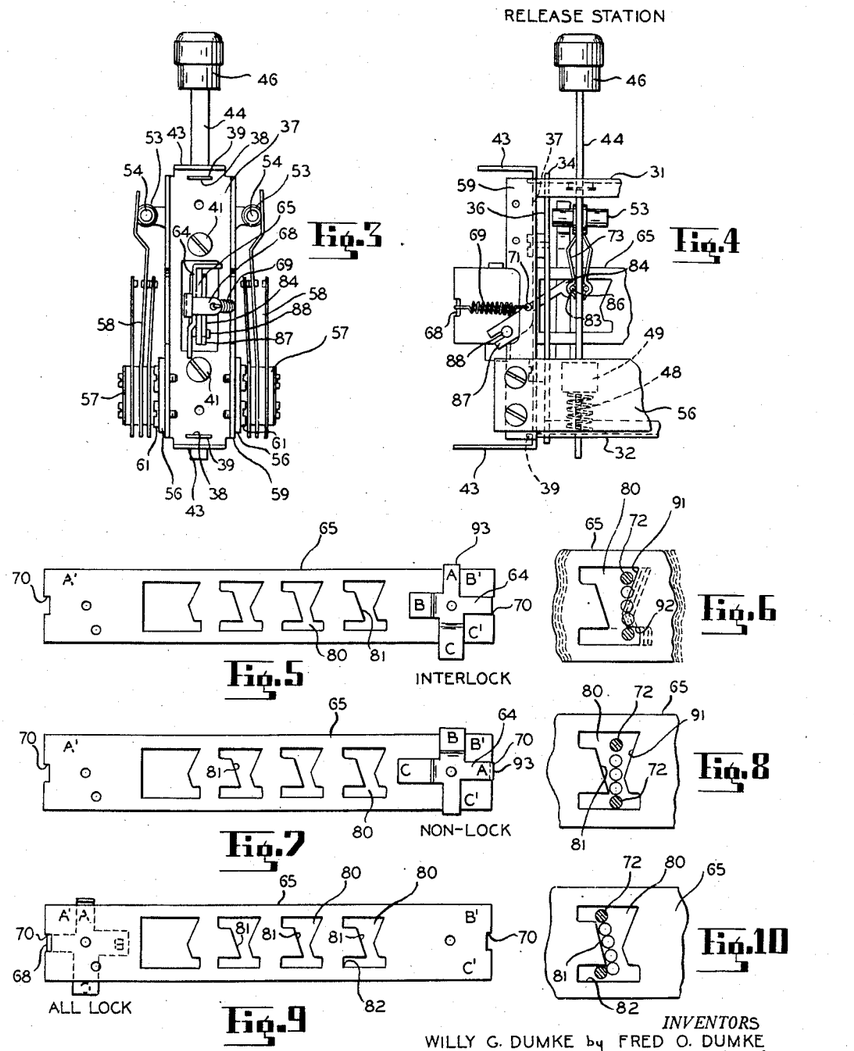
Fig. 3 is an end elevation view of the switch seen in Figs. 1 and 2, said view being taken in the direction of the arrows 3—3 of Fig. 1.
Fig. 4 is a bottom view of a portion of the switch seen in Figs. 1 and 2, showing details of a release station for the push button stations.
Fig. 5 is a plan view of a latch bar employed in the switch assembly seen in Figs. 1 to 4 inclusive, and showing the position adopted by a stop plate for indexing the latch bar to a position for interlock action of the push button plungers of the switch seen in Figs. 1 through 4 inclusive.
Fig. 6 is a fragmentary plan view to an enlarged scale showing the movement of the latch bar relative to a plunger pin carried by the push button plunger during the interlock function of the switch.
Fig. 7 is a plan view similar to Fig. 5, showing the position of the stop plate with respect to the latch bar for indexing the latch bar for the non-lock function of the switch according to the present invention.
Fig. 8 is a fragmentary plan view similar to Fig. 6, and showing how the plunger pin of each actuating plunger clears the camming surfaces of the latch bar whilst the latch bar is maintained in stationary position during the non-locking function.
Fig. 9 is a view similar to Figs. 5 and 7, showing the position of the stop plate with respect to the latch bar for the all-lock function of the switch.
Fig. 10 is a fragmentary plan view similar to Figs. 6 and 8, and showing how the plunger pin carried by the push button plunger moves with reference to both a camming surface of the latch bar and the plunger while the latch bar is maintained in stationary position during such all-lock function of the switch.

As seen also in Fig. 12, the plunger 44 affords a support for switch actuators 53, each being carried on a shaft 54 extending laterally of the plane of the plunger 44. As seen in Figs. 1 to 4, a mounting plate 56 for a plurality of stacks 57 for switches 58 are held to flanges 59 of the members 37 by mounting screws 61. As seen in Figs. 1 and 3 there may be as many as four such stacks arranged to be actuated by each plunger 44 and its actuators 53. The precise form of the switching stack and the switching functions carried on at each forms no part of the present invention and each may be varied in accordance with a desired switching function for such stack.

The plungers 44 in moving to the actuated position cooperate with a latch bar indicated generally by the reference numeral 65. Latch bar 65 is supported at its ends upon the spacer members 36 and the cross frame members 37, and extends through slots 62 and 63 formed in the cross frame member 37 and the spacer 36 respectively. A stop plate 64 is held to the latch bar 65 by means of a screw 66, and the stop plate 64 is in the form of a cross as shown with an indexing arm A which as shown in Fig. 2 is in an indexed position with an index marking A' on the latch bar 65. The other end of the latch bar 65 has similar index markings B' and C' which are on the other side thereof, see also Fig. 1, and which at times are related to the arms B and C of the stop plate 64 for a purpose as will appear as this specification proceeds.

The stop plate 64 also has an arm 67 with a lug 68 extending from the plane thereof, furnishing a point of anchorage for a spring 69, the other end of which is anchored at 71 to the flange 59 of the member 37. In the position seen in Figs. 1 and 4 the latch bar 65 is biased by the spring 69 to a position where the arm B of the stop plate 64 bears against the spacer member 36.

Referring now to Figs. 1, 2, 9, 10 and 12 of the drawings each plunger 44 supports a plunger pin 72 which is retained in position against the plunger 44 by a pair of arms 73 of a U-shaped spring clip 74, riveted to the plunger 44 by rivets 76. Each of the arms 73 has a generally U-shaped saddle 77 near the ends thereof in which the pin 72 is disposed, the bias of the arms 73 forcing the pin against the plunger 44. As seen in Fig. 12 the plunger 44 has an aperture 78 therein through which the latch bar 65 extends, and the plunger pin 72 accordingly bears against the plunger 44 at portions 79 flanking the aperture 78 as seen in Fig. 12.

In Figs. 1 to 4, inclusive, the switch assembly is arranged to function as an all-lock device. That is to say, each plunger 44 can be moved to a locking position, and such and all previously actuated plungers will not be released from their locked position. Such is called the all-lock function of the switch. In such function of the switch, the stop plate 64 has its arm B in abutting relationship with the member 36 as seen in Fig. 2, and in actuating each plunger 44, the pin 72 moves within a punched out opening 80 and over a latching surface 81 of the latch bar 65, the pin 72 moving over the surface 81 as seen in Fig. 10 to a latched position thereof in a latching slot 82 formed in the latch bar 65. During all-lock operation the switch plunger 44 moves to the latching position described, while the latch bar 65 is fixed in position, its position being maintained by means of the spring 69 and the stop plate 64, see Figs. 3 and 4.

Means are provided in the assembly seen in Figs. 1 to 4 inclusive, for releasing any one or all of the stations which have been moved to the locked position described, each plunger being returned to its released position by means of the spring 48. Each release of the plungers is accomplished by moving the latch bar to the right as seen in Figs. 1 and 2, and to the left as seen in Fig. 4. In Figs. 1 and 2 the extreme right plunger 44 is arranged as a release station. The plunger 44 thereof may be provided with the usual switch actuator 53 and the usual switch stack 57 and switching assembly 58, if desired, but its main function is for release of the previously actuated stations by the movement of the latch bar 65 as described.

The plunger 44 accordingly supports an auxiliary plunger pin 83 which is retained in position by the usual spring clip arms 73, except that such spring clip is disposed on the other face of the plunger 44 as described with reference to Fig. 12. The plunger pin 83 at the release station, see Figs. 3 and 4, cooperates with a release rock arm 84 which is arranged to pivot at an eye 86 in one end thereof at the plunger pin 83, the other end of the release arm 84 terminating in a yoke 87 which straddles a pin 88 extending up from the latch bar 65 as seen in Figs. 3 and 4.

It will be seen that actuation of the plunger 44 at the release station seen in Fig. 4 will cause the rock arm 84 to shift the latch bar 65 to the left (to the right as seen in Figs. 1 and 2) to cause the plunger pin 72 at each switching station to be released from the locking slot 82 on the latch bar 65, the spring 48 moving the plunger 44 to the release position.

The switch 30 has thus far been described with reference to its all-lock function, and as will be pointed out now, the switch may also be operated with an interlock function. That is to say, when any other one of the switching stations is actuated, it will cause release of a station which is in the actuated position. In such interlock function, the latch bar is indexed to a proper position and the plunger pin at each station is arranged to move the latch bar to a position to release a previously locked station and to cause locking at the end of its stroke of the plunger then being actuated.

As seen in Figs. 5 and 6, the stop plate 64 is indexed to a position where its arm C is indexed with the marking C' on the latch bar 65. The position of the stop plate 64 for the condition of interlock is at the left end of the latch bar 65 as seen in Figs. 1 and 2. It may be noted that in the interlock position of the stop plate 64 on the latch bar 65, it is disposed on the opposite side thereof, and is shown in dotted outline in Figs. 1 and 2. It may be noted that in the interlock position of the stop plate 64 on the latch bar 65, it is disposed on the opposite side thereof, and is shown in dotted outline in Figs. 1 and 2.

The arm 67 of the stop plate 64 has its lug 68 indexed in a notch 70 at the left end of the latch bar 65, and the spring 69 is connected at one end to the lug 68 and to the other end at 71a to the left hand cross frame member 37 seen in Fig. 1. In such position of the stop plate 64, the arm B of the stop plate 64 will be in abutting relationship with the left spacer member 36. The latch bar 65 will now be indexed to a position where the plunger pins 72 will move along a surface 91 of the latch bar 65 at the opening 80 therein, see also Figs. 5 and 6.

During actuation of the plunger 44 and the movement of the plunger pin 72 with respect to the surface 91, no relative movement takes place between the plunger pin 72 and the plunger 44 as was the case with the all-lock function described with reference to Figs. 9 and 10. By reason of no relative movement between the plunger pin 72 and the latch bar 65, the latch bar 65 must move translatively as seen in Fig. 6, the latch bar 65 taking the successive dotted line positions indicated. At the end of the stroke of the plunger 44 plunger pin 72 will move into a slot 92 on the latch bar 65, the spring 69 moving the latch bar to the left as seen in Fig. 6 to hold the pin 72 in locked position in the slot 92.

Consider the condition occurring when another switching station is actuated. The movement of the plunger pin 72 along the surface 91 will move the latch bar 65, causing the pin 72 of a previously actuated switching station to be released from the slot 92. It will be apparent that by the contour of the surface 91 a previously locked station will be released prior to the actuation and locking of another station.

The switch may also be arranged to have a non-lock function. That is to say, the switching stack at each station may be actuated momentarily and upon release of the push button 46, the spring 48 will return the plunger 44 to the release position. Referring now to Figs. 7 and 8, such may be accomplished by moving the stop plate 64 to a position where its arm B is indexed with a marking B' on the latch bar 65. Referring now to Figs. 1 and 2 of the drawings, the stop plate 64 will be disposed in the described position at the left end of the latch bar 65 (with the exception, of course, that arm B will be indexed with the index mark B'). Arm A has a lug 93 which forms a point of attachment for the spring 69 anchored at its other end at 71A on the cross member 37. Arm C of the stop plate 64 will now be in abutting relationship with the spacer member 36, and the latch bar 65 will be indexed to a position as seen in Fig. 8 where the plunger pin 72 of the plunger 44 will freely pass between the surfaces 81 and 91 at the openings 80 in the latch bar 65.

It will thus be seen that the plunger 44 can be moved to a switch actuating position for momentary switch closings if desired, and upon release thereof to return freely to the released position.

The switch according to the present invention is also provided with means whereby the non-lock function at any desired station may be combined with the interlock or all-lock functions previously described. To this end, the plunger pin 72 at any station may be removed from its position of engagement with the spring holders 73. With the plunger pin thus removed, there is no contact with the surface 81 or 91, depending upon whether the switch is adjusted for the all-lock or interlock function, and it will be apparent that one or more stations of the assembly can be connected for the non-lock function whilst the other stations are arranged with the all-lock or interlock function.

Figures 17, 18:
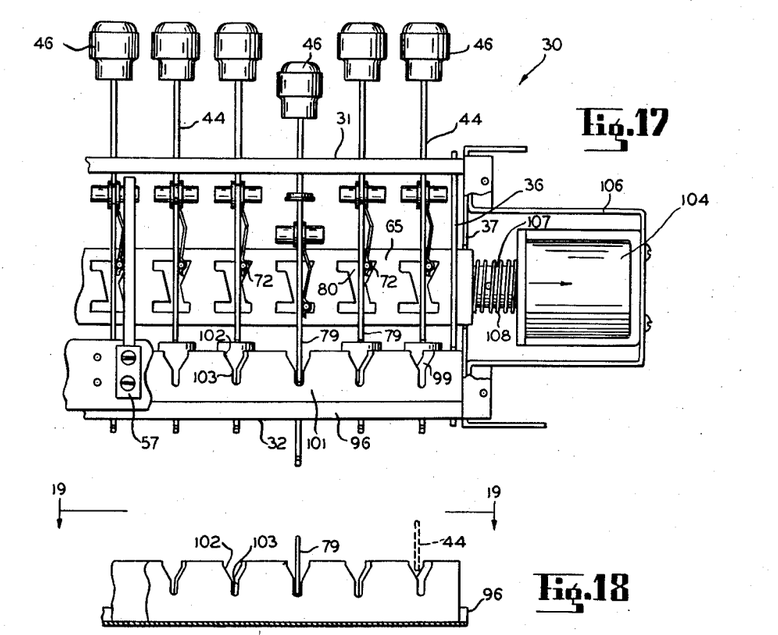
Fig. 17 is a bottom plan view of a push button actuated switch having a positive interlock incorporated therewith to prevent the locking of more than one station at a time, said switch being consructed with a solenoid for moving the latch bar to release an actuated push button station.
Fig. 18 is a detailed plan view of a pair of positive interlock plates which prevent the actuation of a push button plunger at more than one station at a time.
Figure 19:
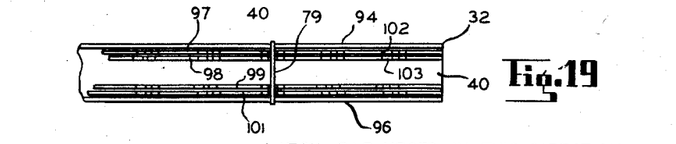
Fig. 19 is a view looking in the direction of the arrows 19—19 of Fig. 18 showing the plunger of a push button actuator as having entered registered slots in the positive interlock pleats, and showing how the other slots of the positive interlock plates are out of register preventing the simultaneous actuation of a push button plunger at another switching station.

Referring now to Figs. 17, 18 and 19 of the drawings the switch may also be arranged so as to have a positive interlock function. In the interlock function described with reference to Figs. 5 and 6, it may be desirable and it is possible to actuate a pair of plungers 44 simultaneously, which would cause release of an already actuated plunger at any station. Under certain conditions it may be desirable that only one station be capable of actuation at any one time by means of the positive interlock.

As shown in Figs. 17, 18 and 19, the rear frame member 32 has an upper flange 94 and a lower flange 96. A pair of positive interlock plates 97 and 98 are arranged to be supported upon the upper edge of spacer members 36, and held in position under the upper flange 94. A similar pair of positive interlocked plates 99 and 101 are arranged to rest upon the lower flange 96 and to be disposed between the flange 96 and the lower edge of spacer members 36. The four plates 97, 98, 99 and 101 are arranged with an essentially V-shaped notch 102 having a bottom slot 103 of a width sufficient to permit entry thereinto of the portions 79 of the plunger 44. The positive interlock plates are arranged to have a limited amount of endwise movement between the cross frame members 37, and are so arranged that only four notches may be in register at any one time as seen in Fig. 19. It will be noted that the central notches 102 and 103 are thus aligned for entrance of the widened portion 79 of the plunger 44 while all notches on either side thereof are misaligned, which would prevent the movement of another station to the actuated position as long as any one station was in the latched position. By the arrangement thus described it is impossible to move a pair of plungers 44 to the latched position.

It should be noted that while the bottom slots 103 are misaligned, the apex of the misaligned V-shaped notch 102 is always coincident with the plane of the actuator 79. This prevents any tendency to bend the plunger 44 by any side thrust against the sides of the V-shaped notch.

The switch shown in Fig. 17 is of a type having power means for moving the latch bar 65 to a position releasing the plungers 44. A solenoid 104 is mounted in a frame 106 secured to the cross frame member 37. In the case shown, the solenoid in the deenergized position holds the latch bar 65 in the proper indexed position for the interlock function. Actuation of each plunger 44 enables the latch plate 65 and an armature 107 of the solenoid 104 to have movement against the bias of a spring 108 surrounding the armature. When the solenoid 104 is energized it will pull the armature 107 and the latch bar 65 to the right as seen in Fig. 7 to release any latched plunger 44.

It is believed apparent that any commercial form of solenoid either a pull or push type may be employed to move the latch bar 65. Release movement of latch bar 65 can also be achieved irrespective of whether the latch bar is indexed for all-lock or interlock function.

Referring now to Figs. 11 to 16 of the drawings, the switch may be arranged to have a lock-in lock-out function. As previously referred to in the objects of this invention, the switch may be arranged to function as an all-lock device, and a number of selected stations may thus be actuated. Following the actuation of a desired group of stations, one or more in number, the switch may lock against unintended selection of an unwanted station, and furthermore, selected stations of the group may not be released unless all of the stations are released.

As will be pointed out, such lock-in lock-out of the actuated switch may also be had where the switch functions as an interlock device. When a single station (during interlock) is selected, and the lock-in station is actuated, no other switching station can be actuated until the lock-in station is released.

Figure 11:
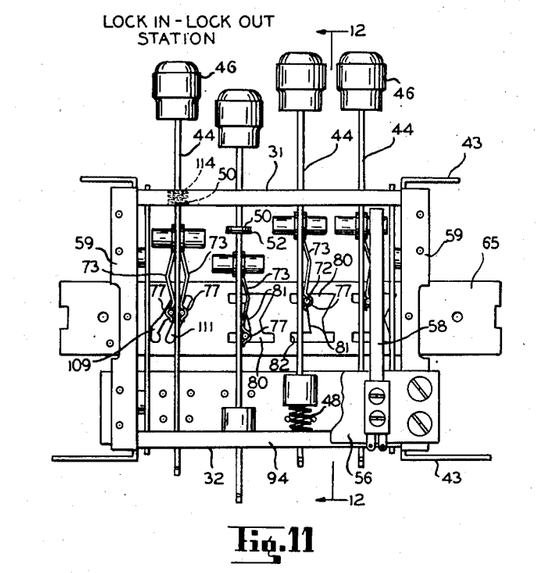
Fig. 11 is a top plan view of the switch with its latch bar connected for the all-lock function, said latch bar being configured so as to lock-in a group of push button stations which have been actuated, and also so as to lock-out any stations from actuation once the lock-out mechanism has been actuated.

Referring now to Fig. 11, the latch bar 65 is indexed to the all-lock position as seen in Figs. 1 and 2 of the drawings. Such indexing of the latch bar is achieved by the lock-in lock-out station to be described. Under such condition, the plunger pins 72 move over the surfaces 81 of the latch bar 65 whilst it is maintained in fixed position, and the plunger pin 72 moves into the notch or slot 82 as seen in Figs. 9 and 10. A number of stations may be selected, according to the number of switching stations of the assembly (generally more than the number shown in Fig. 11. When the desired selection has been made, the stations are maintained in the locked position while the selection of an unintended station is prevented.

Figure 13:
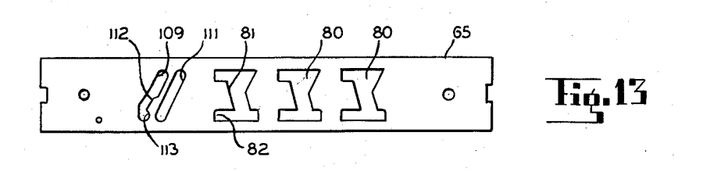
Fig. 13 is a plan view of a latch bar having a lock-in lock-out latch therein for cooperation with the plunger at the lock-in lock-out station.
Figure 14:
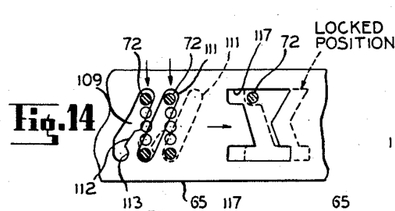
Fig. 14 is a fragmentary plan view to an enlarged scale of a latch bar having a lock-in lock-out latch therein, and showing the position of the plunger pins of the lock-in lock-out plunger thereof at the start of the lock-in lock-out movement, and showing the position of a push button station which has not been actuated, and showing also the translatory movement given to the latch bar by the operation of the lock-in lock-out latch of such latch bar.

In order to prevent such unintended selection, the latch bar 65 is shifted to the right as seen in Fig. 11 by means of a lock-in lock-out station shown in Fig. 11. The plunger 44 of such station is provided with the spring clips 73 for the plunger pins 72, one being disposed on each side of the plunger 44, and the spring clip 73 having the generally U-shaped saddle 77 for retaining same. However, plunger pins 72 at the lock-in lock-out station are arranged to move in side-by-side slots 109 and 111 in the latch bar 65. Slots 109 and 111 are inclined at an angle to the longitudinal axis of the latch bar 65, to cause a translative movement thereof to the right upon actuation of the plunger 44 of the lock-in lock-out station in Fig. 11. Referring to Fig. 13, slot 109 has a cam surface 112 which leads to a detent 113 for the plunger pin 72 movable in the slot 109. It will be seen that the plunger pin 72 moving in the slot 111 serves to shift the latch bar 65 to the right as seen in Figs. 11 to 16 of the drawings, whilst both the plunger pins 72 serve to maintain the latch bar 65 in the shifted position as seen in Fig. 14.

The plunger 44 is moved to the released position of the lock-in lock-out station against the bias of a spring 114 which is bottomed at one end against the inner side of the front frame member 31 and at the other end against the shoulder 50 formed on said plunger.

During the released position of the lock-in lock-out station the two plunger pins 72 occupy a position at a midway point in the slots 109 and 111, which serves to index the latch bar properly for the all-lock function. The resilience of the spring clip 73 acts against plunger pins 72 tightly to grip the sides of slots 109 and 111.

The spring 114 at the lock-in lock-out station urges the plunger 44 and one of the pins 72 against a camming surface 115 in slot 109. The resiliency of the spring clips 73 and plunger pins 72 act to grip the latch bar in position at the surface 115.

Figure 16:
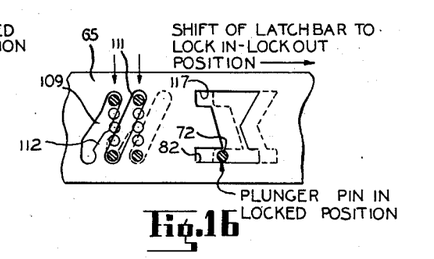
Fig. 16 is a view similar to Fig. 15 showing the translatory movement of the latch bar upon actuation of the lock-in lock-out latch to hold the plunger pin at a push button actuated station in a locked position.

When the latch bar 65 has been shifted to a locked position as seen in Figs. 14 and 16, the plunger pin 72 of a station which has not been actuated is maintained in a slot 117 on the latch bar, whilst the plunger pin 72 of an actuated station is moved further into the slot 82 as seen in Fig. 16. When all of the lock-in stations are desired to be released, the plunger 44 of the lock-in lockout station is moved against the bias of the spring 114, the plunger pins 72 moving in their respective slots 109 and 111, until all of the plungers 44 of the actuated stations are released from their slots 82 to return with their plunger 44 to the inoperative position by the bias of the spring 48 at each station.

Figure 19A:
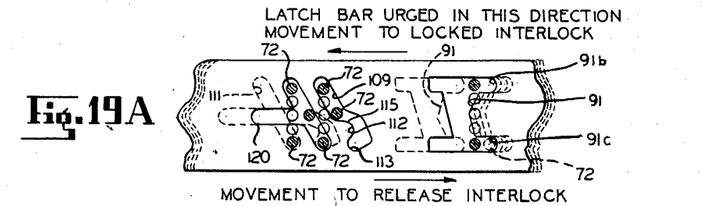
Fig. 19a is a plan view of a latch bar having a lock-in lock-out latch therein for cooperation with the plunger at the lock-in lock-out station, the form shown being for use with a push button switch having an interlock function.

Referring now to Fig. 19A of the drawings, the switch according to the present invention may also be arranged with the interlock function together with the lock-in lockout station. In this arrangement the lock-in lock-out station acts to hold the latch bar 65 in position, but during actuation of a switching station to enable translative movement of same for its interlock function.

The lock-in lock-out station is accordingly constructed so that the plunger pins 72 move over cam surfaces 91 at each switching station, actuation of each switching station causing the translative movement described.

Figure 15:
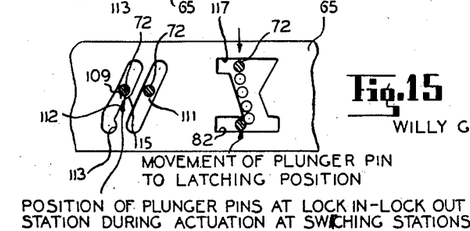
Fig. 15 is a view similar to Fig. 14, showing the position of the plunger pin of a push button plunger in a latched position on the latch bar, preparatory to operation of the lock-in lock-out latch.

It may be noted that the slots 109 and 111 at the lock-in lock-out station shown in Fig. 19A may be considered as being rotated 180° from the position seen in Figs. 14 to 16 from the plane of the latch bar 65 and back thereinto.

When the plunger pins 72 at the lock-in lock-out station engages the sides of the slots 109 and 111, one of the pins 72 bears against the surface 115 under the urgence of the spring 114. The latch bar 65 is accordingly urged to a position where plunger pin 72 at each switching station contacts the camming surface 91 at the opening 80 in the latch bar 65.

However, actuation of a plunger at each switching station causes the latch bar 65 to move translatively to the right as seen in Fig. 19A, as indicated by the dotted lines. This translative movement is accommodated at the lock-in lock-out station, plunger pin 72 in slot 109 moving yieldably by its spring clip 73. Plunger pin 72 in slot 111, during such translative movement of latch bar 65 is enabled to move into a slot 120 continuous with slot 111 and lying along the longitudinal axis of the latch bar 65.

Movement of the plunger pins 72 in the slots 109 and 111 to a position where one of the plunger pins engages the detent portion 113 of slot 109 causes the latch bar 65 to shift to the left to a position locking an actuated switching station. The camming surface 91 is continuous with a locking slot 91c into which the plunger pin 72 of a switching station can move, thereby locking the switching station.

The so-locked switching station is released by actuation of the lock-in lock-out station in the reverse direction. The plunger pins 72 thereat move in the opposite direction in the slots 109 and 111, thus shifting the latch bar 65 in the opposite direction to the right enabling the plunger pin 72 at a switching station to return to a non-actuated position.

Unactuated switching stations are prevented from being actuated by the translative movement of latch bar 65 to the left as seen in Fig. 19A by a slot 91b into which the plunger pin 72 moves.

Referring now to Figs. 20 to 25 of the drawings, each switch assembly may be made a part of an assembly consisting of tiers, each tier being composed of the switch assembly 30. The assemblies 30 may be maintained in proper spaced apart relationship by means of vertical spacers 121 which are secured to the front frame member 31 of each assembly by means of small screws 122. Such an assembly of switches may be provided with a release station for all of the switching stations of the assembly, and the latch bar 65 of each switch assembly is arranged to be moved to the release position by actuation of the master release station.

Figures 21, 22, 23, 24, 25:
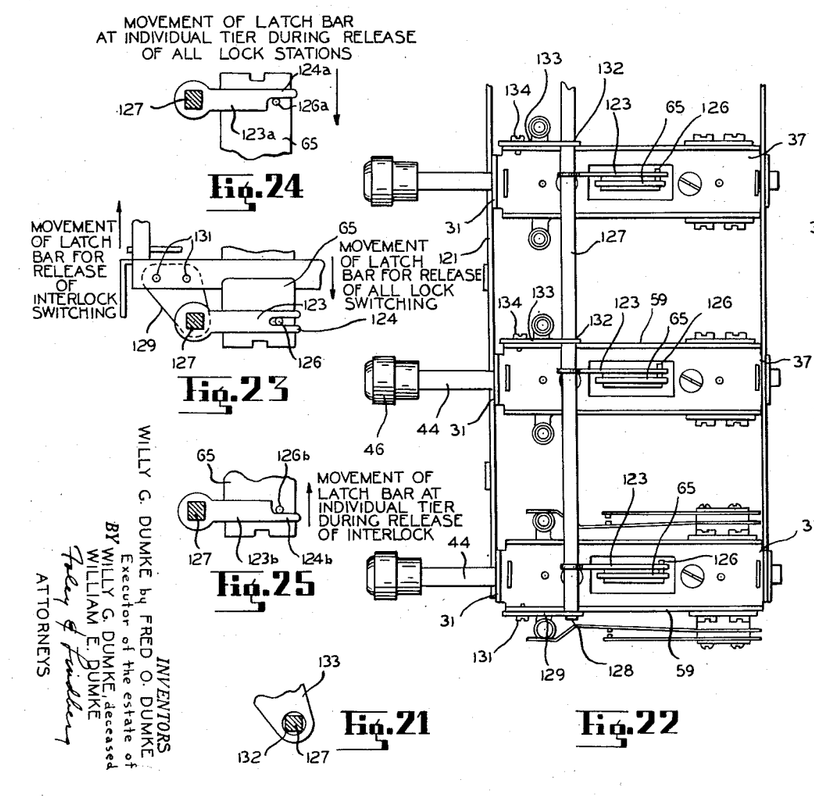
Fig. 21 is a sectional view taken along the line 21—21 of Fig. 20 looking in the direction of the arrows, showing a detail of the coupling bar means.
Fig. 22 is an end elevation view of such a bank of switches, said view looking in the direction of the arrows 22—22 of Fig. 20.
Fig. 23 is a plan view of an actuator mechanism for the switch tiers seen in Figs. 20 and 22, whereby an individual tier of switches may be returned to the released position, said view being taken looking in the direction of the arrows 23—23 of Fig. 20, said release mechanism functioning for bank interlocking, or as a master release for all-lock and lock-in lock-out functions.
Fig. 24 is a detailed plan view of a release actuator for an individual bank where the switches of the bank are assembled for the all-lock function, whereby master release of all the tiers may be effected, and whereby the release of an individual tier of all-lock switches may be effected.
Fig. 25 is a detailed plan view of a release actuator at an individual tier where the switches of such tier are arranged for the interlock function.
Figure 26:
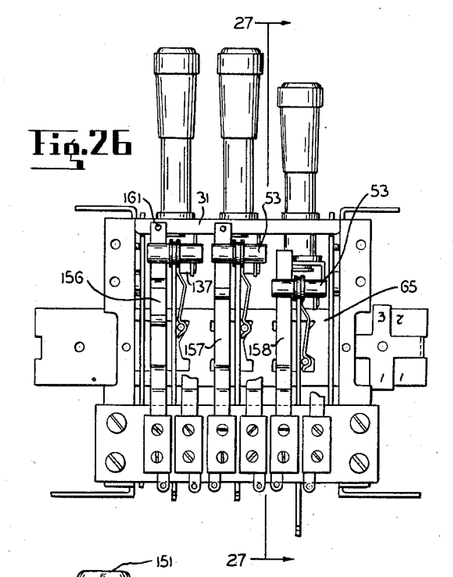
Fig. 26 is a plan view of a push button switch according to the present invention, showing an arrangement whereby the moving push button actuator may be illuminated.
Figure 27:
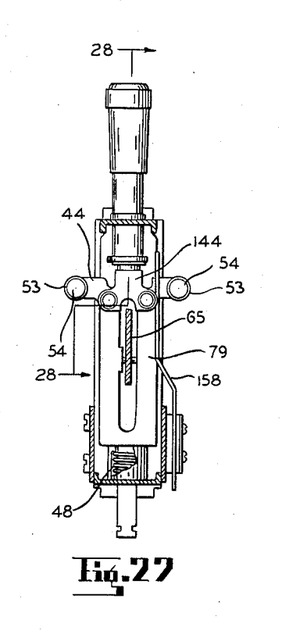
Fig. 27 is a view taken along the line 27—27 of Fig. 26 looking in the direction of the arrows.

As seen in Fig. 23, the movement of the latch bar 65 rocks a lever 123, lever 123 having a yoke 124 which straddles a pin 126 extending from the lowermost latch bar 65. The lever 123 is made fast to a square shaft 127 which is journaled at its lower and upper ends 128 in plates 129 held by a screw 131 to the flange 59 of the cross frame members 37. The shaft 127 is journaled as at 132 in a plate 133 at each tier, such plate being held in position by a screw 134 tapped into the flange 59 of such assembly.

Figure 20:
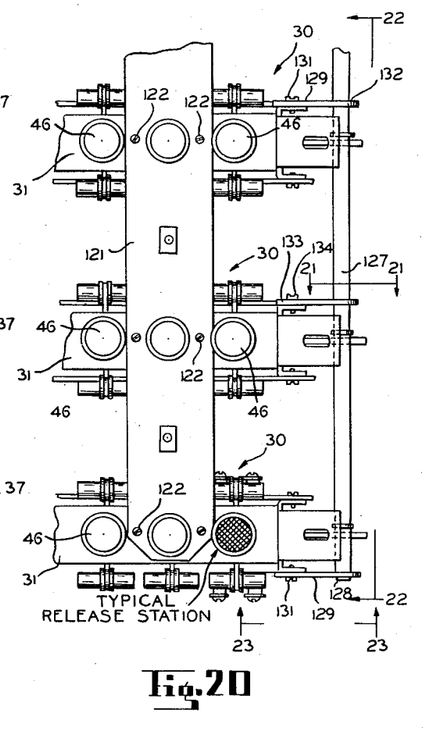
Fig. 20 is a front elevation view of a group of switches disposed in banks or tiers one on top of another, and showing means for coupling the latch bar of each tier to a release station for releasing the plungers in each tier.

For release of the all locked switching stations when the switches are connected in tiers, the master release station is mounted generally at the lower right corner of the banks of switches as see in Fig. 20. Actuation of the release station shown shifts the latch bar 65 to the right as seen in Fig. 20. The movement of the latch bar 65 is also shown in Fig. 23, the lever 123 rocking the shaft 127.

The rocking of the lever 123 at each tier similarly moves the latch bar of each such tier.

However, it may be desirable to release the stations of each tier independently of the release by the master station, and to this end a similar shaft 127 is mounted to the left end of the switch bank seen in Fig. 20. As seen in Fig. 24, such construction dispenses with the double yoke 124 on rocking lever 123, and instead at each tier a lever 123a having a single finger 124a engages a pin 126a on the latch bar at such tier.

It is apparent that the all-locked switch stations at such tier may be released by movement of the latch bar of such tier in the direction of the arrows. In such case a separate release station is provided for such tier.

For release of the interlocked switches of the bank shown in Fig. 20 the release station may be arranged at the lower left corner of the bank. This location is indicated unless the switches are turned over in each tier under which condition the release station would be in the same position as for release of all-lock stations.

It may also be desirable to have an interlock station in each tier actuated, and to release the actuated interlocked station of such tier, without affecting the master release station. To this end and as seen in Fig. 25 the shaft 127 rocks a lever 123b at each tier. Lever 123b has a single actuating finger 124b cooperating with a pin 126b on the latch bar.

During interlock switching at each tier, or release at each tier, the latch bar 65 moves as shown by the arrow, unaffected by the lever 123b. However, when the master release station is actuated the finger 124b moves the latch bar 65 in the direction shown by the arrow at such figure.

The latch bars 65 of all the switch assemblies may be indexed according to whether the all-lock or the interlock function is desired; likewise, the master release station for all of the switching stations can be instead a lock-in lock-out station in the case where the latch bars are indexed for the all-lock position. The lever 123 on such lock-in lock-out movement of the latch bar can be employed to transmit through the shaft 127 such lock-in lock-out movement to the latch bar at each tier of the entire assembly.

Figure 28:
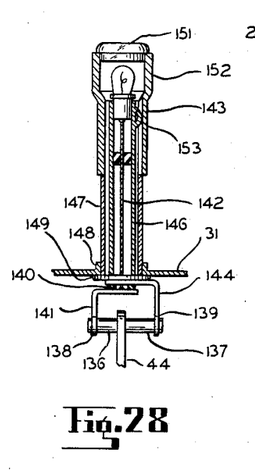
Fig. 28 is a longitudinal sectional view taken along the line 28—28 of Fig. 27 looking in the direction of the arrows, certain parts being shown in elevation.

Referring now to Figs. 26 to 31 of the drawings, there is shown an arrangement whereby the push button actuator at each switching station may be illuminated. In such case, the plunger 44 terminates at a point spaced from the front frame member 31. The end of the plunger 44 supports a pair of insulating sleeves 136 and 137 which electrically isolate contact arms 138 and 139 respectively. Contact arm 138 has a lug 141 which is bent as shown in Fig. 28, and to which is connected a lead 142 to an indicating bulb 143. The other contact arm 139 has a lug 144 bent in the manner shown and electrically connected to a socket 146 for the lamp indicator 143. The two lugs 144 and 141 are isolated electrically by an insulating washer 140. The two electrodes 142 and 146 are housed within a sleeve 147 which is guided in a ferrule 148 drawn from the web 40 of the front frame member 31, and having a stop washer 149 which bears against the inner side of the rail 31 when the switch is in the nonactuated position. A translucent jewel 151 is mounted in an essentially sleeve shaped member 152 which is guided on a land 153 struck out from a socket 146, so as to enclose the lamp indicator 143. The two contacts 138 and 139 may be arranged with auxiliary switches seen in Figs. 29 to 31 to indicate to the operator that the particular switching station has been actuated by reason of the fact that the lamp indicator is on.

Contact arms 138 and 139 are each arranged to actuate auxiliary leaf switch arms 156, 157 or 158 according to the condition of illumination desired for the lamp 143 upon actuation of the switch. Irrespective of which type of leaf is employed it is mounted as part of the usual switch stack 57 seen in Figs. 1 to 3. The usual switch stack 57 is actuated by the switch actuator 53 seen in Figs. 1 to 3, and contact arms 138 and 139 are intended for the illumination of the lamp 143.

Figures 29, 30:
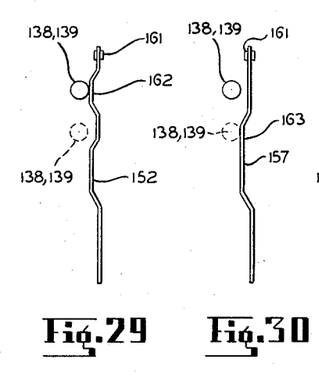
Fig. 29 is a side elevation view of a switch leaf cooperating with the illuminated actuator of Figs. 26 and 27, said switch leaf being actuated by movement of the plunger to extinguish the lamp thereof.
Fig. 30 is a view similar to Fig. 29 but showing a switch leaf which energizes the lamp of the actuator by movement thereof.

In Fig. 29 there is shown the switch leaf 156 having an insulating bumper 161 at the end thereof, which bumper 161 rests upon the rail 31. Leaf 156 has a lobe 162 contacted by arm 138 or 139 when the switching station is in the non-actuated condition. When the station is actuated, movement of plunger 44 causes arm 138 or 139 to leave the lobe 162 to deenergize lamp 143.

In Fig. 30 there is shown the leaf 157 which is constructed to illuminate the lamp 143 upon actuation of the switching station. Switch leaf 157 has a lobe 163 which is contacted by the arm 138, the lamp 143 being deenergized by return of the plunger 44 to the non-actuated position.

Figure 31:
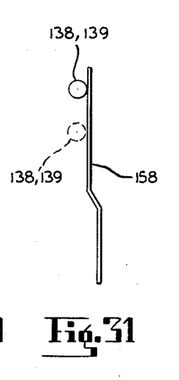
Fig. 31 is a similar view of another form of switch leaf which maintains the actuator lamp energized at all times.

In Fig. 31 the arm 138 is arranged to cooperate with the leaf 158 to maintain the lamp 143 illuminated in all positions.

From the description foregoing it will be apparent that there has been provided a new and useful improvement in the art of push button switching. The latch bar for the push button plungers is common to the switch whether it be for the all-lock, interlock or non-lock functions. It will be evident, also, that the latch bar 65 may be employed where the switch is to be operated in a lock-in lock-out system where a desired "programming" of all-lock stations may be desired. It is evident, also, that the change from the all-lock to interlock, or non-lock functions can be accomplished by a simple change of position of the stop plate which has been described.

It will be evident also that there has been provided a novel illuminated plunger for each switching station. Any desired condition of illumination may be had by simple change in the switch leaves for the lamp for the switching station.

While the invention has been described in terms of a number of preferred embodiments thereof and by reference to the functions which the switch may perform, the scope of the invention is not intended to be limited by the foregoing description, which is by way of illustration only, the scope of the invention being intended to be limited by the claims here appended.

We claim as our invention:

1. In a push button switch selectively adjustable for all-lock, interlock and non-lock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position, and for indexing said latch bar to a third position, said latching means moving with said plunger out of contact with said latching surfaces for momentary actuation of said plunger, said means for indexing said latch bar comprising a stop plate secured to said latch bar and having arms of different lengths selectively in engagement with said frame.

2. In a push button switch selectively adjustable for all-lock, interlock and non-lock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position, and for indexing said latch bar to a third position, said latching means moving with said plunger out of contact with said latching surfaces for momentary actuation of said plungers.

3. In a push button switch selectively adjustable for all-lock, interlock and non-lock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position, and means whereby the latching means may be detached from said push button plunger for non-latching actuation thereof for either indexed position of said latch bar.

4. In a push button switch selectively adjustable for all-lock and interlock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position, the contact of said latching means with said last named latching surface shifting said latch bar to release a previously actuated station.

5. In a push button switch selectively adjustable for all-lock and interlock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position, and a lock in-lock out station supported on said frame for shifting said latch bar to a position to prevent actuation of other switching stations.

6. In a push button switch selectively adjustable for all-lock and interlock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position, said means for indexing said latch bar comprising a stop plate secured to said latch bar and having arms of different lengths selectively in engagement with said frame.

7. In a push button switch selectively adjustable for all-lock and interlock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position, and means for shifting said latch bar to a position to release the actuated plungers.

8. In a push button switch selectively adjustable for all-lock and interlock operation, a plurality of switching stations, a frame, a push button plunger at each switching station supported on said frame, latching means supported by said plungers, a latch bar, an opening in said latch bar at each switching station, each of said openings being defined by a pair of spaced latching surfaces engageable by said latching means when said plunger is moved to actuated position, means for indexing said latch bar to a first position corresponding to all-lock operation of said switching stations, said latching means during such first position moving in contact with one of said spaced latching surfaces when said plunger moves to actuated position, and for indexing said latch bar to a second position corresponding to interlock operation of said switch, said latching means during such second position of the latch bar moving in contact with the other of said spaced latching surfaces when said plunger moves to actuated position.

9. In a push button switch selectively adjustable for all-lock, interlock and non-lock operation, a plurality of switching stations, a push button plunger at each switching station, latching means supported by said plungers, a latch bar, a pair of spaced latching surfaces on said latch bar at each switching station, said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position, and for indexing said latch bar to a third position, said latching means moving with said plunger out of contact with said latching surfaces for momentary actuation of said plunger, said means for indexing said latch bar comprising a stop plate secured to said latch bar and having arms of different lengths selectively in engagement with a fixed abutment.

10. In a push button switch selectively adjustable for all-lock, interlock and non-lock operation, a plurality of switching stations, a push button plunger at each switching station, latching means supported by said plungers, a latch bar, a pair of spaced latching surfaces on said latch bar at each switching station, said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position, and for indexing said latch bar to a third position, said latching means during such position of the latch bar moving with said plunger out of contact with said latching surfaces for momentary actuation of said plungers.

11. In a push button switch selectively adjustable for all-lock and interlock operation, a plurality of switching stations, a push button plunger at each switching station, latching means supported by said plungers, a latch bar, a pair of spaced latching surfaces on said latch bar at each switching station, said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position, said means for indexing said latch bar comprising a stop plate secured to said latch bar and having arms of different lengths selectively in engagement with said frame.

12. In a push button switch selectively adjustable for all-lock and interlock operation, a plurality of switching stations, a push button plunger at each switching station, latching means supported by said plungers, a latch bar, a pair of spaced latching surfaces on said latch bar at each switching station, said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position, the contact of said latching means with said last named latching surface shifting said latch bar to release a previously actuated station.

13. In a push button switch selectively adjustable for all-lock and interlock operation, a plurality of switching stations, a push button plunger at each switching station, latching means supported by said plungers, a latch bar, a pair of spaced latching surfaces on said latch bar at each switching station said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position, and a lock-in lock-out station for shifting said latch bar to a position to prevent actuation of other switching stations.

14. In a push button switch selectively adjustable for all-lock, interlock and non-lock operation, a plurality of switching stations, a push button plunger at each switching station, latching means supported by said plungers, a latch bar, a pair of spaced latching surfaces on said latch bar at each switching station, said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position, and means whereby the latching means may be detached from said push button plunger for non-latching actuation thereof for either indexed position of said latch bar.

15. In a push button switch selectively adjustable for all-lock and interlock operation, a plurality of switching stations, a push button plunger at each switching station, latching means supported by said plungers, a latch bar, a pair of spaced latching surfaces on said latch bar at each switching station, said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position, and means for shifting said latch bar to a position to release the actuated plungers.

16. In a push button switch selectively adjustable for all-lock and interlock operation, a plurality of switching stations, a push button plunger at each switching station, latching means supported by said plungers, a latch bar, a pair of spaced latching surfaces on said latch bar at each switching station, said latching surfaces being engageable by said latching means when said plunger is moved to actuated position, means for indexing said latch bar to a first position corresponding to all-lock operation of said switching stations, said latching means during such first position moving in contact with one of said spaced latching surfaces and relatively to said plunger when said plunger moves to actuated position, and for indexing said latch bar to a second position corresponding to interlock operation of said switch, said latching means during such second position of the latch bar moving in contact with the other of said spaced latching surfaces when said plunger moves to actuated position.

17. In a push button switch having a plurality of switching stations, a push button plunger at each switching station, latching means supported by said plungers, a latch bar, a pair of latching surfaces on said latch bar at each switching station, said latching surfaces being engageable by said latching means when said plunger is moved to actuated position, means for indexing said latch bar to a position for all-lock operation of said switching stations, said latching means moving over one of said latching surfaces and with respect to said plunger when said plunger moves to actuated position, said latch bar being maintained in fixed position during actuation of said plungers, said means for indexing said latch bar comprising a stop plate secured to said latch bar and having arms of different length selectively in engagement with a fixed abutment.

18. In a push button switch having a plurality of switching stations, a push button plunger at each switching station, latching means supported by said plungers, a latch bar, a pair of latching surfaces on said latch bar at each switching station, said latching surfaces being engageable by said latching means when said plunger is moved to actuated position, means for indexing said latch bar to a position for all-lock operation of said switching stations, said latching means moving over one of said latching surfaces and with respect to said plunger when said plunger moves to actuated position, said latch bar being maintained in fixed position during actuation of said plungers, and means whereby the latching means may be detached from said push button plunger for non-latching actuation thereof for such indexed position of said latch bar.

19. In a push button switch having a plurality of switching stations, a push button plunger at each switching station, latching means supported by said plungers, a latch bar, a pair of latching surfaces on said latch bar at each switching station, said latching surfaces being engageable by said latching means when said plunger is moved to actuated position, means for indexing said latch bar to a position for all-lock operation of said switching stations, said latching means moving over one of said latching surfaces and with respect to said plunger when said plunger moves to actuated position, said latch bar being maintained in fixed position during actuation of said plungers, and a lock in-lock out station for shifting said latch bar to a position to prevent actuation of other switching stations.

20. In a push button switch having a plurality of switching stations, a push button plunger at each switching station, latching means supported by said plungers, a latch bar, a pair of latching surfaces on said latch bar at each switching station, said latching surfaces being engageable by said latching means when said plunger is moved to actuated position, means for indexing said latch bar to a position for interlock operation of said switching stations, said latching means moving over one of said latching surfaces and with said plunger when said plunger moves to actuated position, said latch bar shifting to release a previously actuated plunger when said latching means moves over said latching surface to the actuated position of said plunger, and means whereby the latching means may be detached from said push button plunger for non-latching actuation thereof for the aforesaid indexed position of said latch bar.

21. In a push button switch selectively adjustable for all-lock, interlock and non-lock operation, a frame, a plurality of switching stations including a plunger at each switching station movable with respect to said frame to and from actuated positions, a latch bar supported on said frame, and means for indexing said latch bar to positions determinative of all-lock, interlock and non-lock operation of said push button actuators.

22. A push button switch assembly comprising a plurality of tiered switch assemblies, each of said switch assemblies comprising a frame, a plurality of plungers movable with respect to said frame to and from actuated positions, a latch bar supported on said frame, said latch bar holding a plunger in an actuated position, a master release station on one of said switch assemblies, means coupling said latch bars for translative movement to release an actuated plunger, and means controlled by actuation of said master release station to shift said latch bars.

23. A push button switch assembly comprising a plurality of tiered switch assemblies, each of said switch assemblies comprising a frame, a plurality of plungers movable with respect to said frame to and from actuated positions, a latch bar supported on said frame, said latch bar holding a plunger in an actuated position, a release station on each switch assembly for shifting the latch bar of said assembly translatively to release an actuated plunger, a master release station on one of said switch assemblies, means coupling said latch bars for translative movement to release an actuated plunger, and means controlled by actuation of said master release station to shift said latch bars translatively.

24. In a push button switch selectively adjustable for all-lock, interlock and non-lock operation, a frame, a plurality of switching stations including a plunger at each switching station movable with respect to said frame to and from actuated positions, a latch bar supported on said frame, a pair of spaced latching surfaces on said latch bar at each switching station, and means for indexing said latch bar to positions determinative of all-lock, interlock and non-lock operation of said push button actuators.

References Cited in the file of this patent

UNITED STATES PATENTS

| 1,810,399 | Horni | June 16, 1931 |
| 2,069,382 | Morton et al. | Feb. 2, 1937 |
| 2,200,076 | Cooper | May 7, 1940 |

FOREIGN PATENTS

| 366,607 | Great Britain | Feb. 11, 1932 |